Patented Aug. 19, 1952

2,607,428

UNITED STATES PATENT OFFICE 2,607,428

SEALING COMPOSITION AND METHOD FOR TEMPORARILY SEALING OIL WELLS

Donald C. Bond, Northbrook, and George G. Bernard, Chicago, Ill., assignors to The Pure Oil Company, Chicago, Ill., a corporation of Ohio No Drawing. Application August 29, 1946, Serial No. 693,829

12 Claims. (Cl. 166—22)

This invention relates to a composition of matter especially suitable for sealing of earth bored holes, wells, or dams, and is particularly adaptable to the sealing of acid-treated wells and the selective sealing of portions of wells before acid treating.

Treatment of oil wells with hydrochloric acid to increase the porosity of calcareous formations to facilitate the extraction of oil is often a desirable expedient. Before or during such treatment of an oil well, it often becomes desirable to seal off one or more sections in order to restrict the action of the treating agent to a particular formation. Subsequently, it becomes necessary to remove the seal in order to make further use of the well.

Common sealing methods in use employ either an inorganic cementing agent like plaster of Paris which has an appreciable time lag in its setting characteristics to permit the slurry to be pumped underground, or an organic gel which temporarily seals the earth formation. Both methods are subject to serious disadvantages, the first because the hardened inorganic cement must be removed mechanically when the seal is no longer needed, and the second because the organic gel generally contains bacteria, which, by their normal activity, produce a liquefaction of the seal. Sometimes the bacteria liquefy the seal prematurely, other times it is necessary to wait after need for the seal has passed until liquefaction is complete. It is apparent that in neither process do the surface operators have any control over the selectivity of the sealing or the time factor involved in the sealing operation.

Accordingly, it is an object of the invention to provide a composition for sealing off earth structures, particularly oil wells and acid treated oil wells, so that the seal can be opened as readily as it can be made. In the preferred manner of using the composition it is possible to effect selective or temporary sealing of any part of a well to be acid treated, or, if desired, the entire well.

Another object of the invention is to provide a novel method for temporarily sealing off well formations.

A further object of the invention is to provide a method for the selective treatment of wells with acid and the composition of this invention.

Other objects and advantages of the invention will in part be obvious, and in part appear hereafter.

We have discovered that a well sealing cement can be prepared from a combination of plaster of Paris and an amide, preferably an amide of an inorganic acid, typified by sulfamic and phosphamic acids, which combination of ingredients develops to a useful degree the property of being acid resistant and subject to disintegration by alkalies when the composition is mixed with water and allowed to set, that is, the set cement is inert to and unaffected by acids of about the concentration generally encountered in oil well treatment processes, and is softened and disintegrated completely by such alkaline materials as alkali metal hydroxides and carbonates. Typical compositions comprise mixtures of plaster of Paris and an amide to furnish alkali susceptibility and other addition agents such as set retarding agents to provide a certain amount of control over the setting time. Set retarders can be added to the composition to control the setting time, and they can be selected from such classes of materials as glycols, glycerine, or gelatin, or similar viscous organic materials.

With the plaster of Paris there is mixed about an equal or smaller proportion of an amide, such as sulfamic acid, and a set retarding agent, such as glycerine or gelatin. When the ingredients are thus mixed, a cement composition is produced which develops useful characteristics of acid resistance and alkali susceptibility. The cement will have a somewhat extended setting time thereby permitting the slurry which is made up when water is added to be pumped into the earth formation to be sealed. The composition will then set to a hard, strong mass which is not affected appreciably over periods as long as 24 to 48 hours by hydrochloric acid of a concentration of about 15 per cent. However, the cement, after it has set, is readily disintegrated by alkali metal hydroxides and carbonates in about 40 per cent aqueous solution.

In the preparation of the composition the dry plaster of Paris and the amide are weighed out in the proportions needed and thoroughly mixed in some form of mechanical mixing device, such as a pebble mill. The depth of the earth formation it is desired to seal having been determined, all that remains is to mix the plaster and amide with glycerine and water to form a smooth slurry of rather high flowability and to pump it into the formation. Should the formation to be sealed be extremely deep, it might be desirable to add more set retarding agent in amount sufficient to delay setting or to agitate the mix strongly during handling and pumping in order to allow time for the slurry to reach and permeate the particular formation.

The following examples will illustrate a few typical compositions prepared according to our invention:

Example I

A mixture of 25 parts by weight of plaster of Paris, 15 parts of sulfamic acid, and 10 parts glycerine was prepared and mixed with 10 parts of water to form a smooth easy flowing cream which at the end of one-half hour had set to a hard solid mass. After drying, the set mass was submerged in 15 per cent hydrochloric acid for 24 hours with no sensible effect on the hardness or rigidity of the mass. Subsequently, when submerged in 40 per cent aqueous sodium hydroxide solution, the cement was softened and disintegrated and readily reduced to a wet slurry. A more rapid disintegration was obtained when a sample of the set cement was treated with 40 per cent potassium hydroxide solution.

Example II

A mixture of 15 parts by weight of plaster of Paris, 5 parts of sulfamic acid, and 2 parts of gelatin was prepared. When mixed with 10 parts of water it formed a smooth easy flowing slurry which set to a solid mass in one-half hour. The mass was submerged in 15 per cent hydrochloric acid for 24 hours after which time its surface shows no significant amount of softening. Upon treatment with 40 per cent sodium hydroxide solution the cement was disintegrated rapidly.

Example III

A mixture of 15 parts by weight of plaster of Paris, 10 parts of sulfamic acid, and 3 parts of ethylene glycol was prepared. When mixed with 10 parts of water it formed a free-flowing cream which set to a solid mass in 20 minutes. The set cement was not affected by 15 per cent hydrochloric acid when exposed to it for a period of 24 hours, but was disintegrated readily by 40 per cent aqueous sodium hydroxide solution.

Cement samples having the compositions indicated above, that is, about 40 to 75 per cent plaster of Paris, about 15 to 45 per cent of the amide, and about 5 to 30 per cent of the set retarding agent, all by weight, were prepared and tested according to the procedure outlined. The amount of water used should be sufficient to bring about setting of the cement but in general should not exceed about one-half of the total weight of the plaster of Paris, the amide, and the set retarding agent in order that the composition might be of good consistency and have a reasonably short setting time. The samples were allowed to set to full strength and then submerged in 15 per cent hydrochloric acid for 24 hours. In no case did more than superficial softening of the surface of the sample occur. Subsequently, the samples were submerged in aqueous alkali metal hydroxide and carbonate solutions of 20 to 50 per cent concentrations. In all cases the samples were disintegrated readily. It appears that the disintegrating reaction is one which takes place between the alkali and the acid included in the cement. Since the acid, for example, sulfamic acid, is dispersed throughout the crystallized foraminous structure of the cement, its neutralization or destruction disintegrate the structure.

The advantages resulting from employing this acid-resistant and alkali-susceptible cement are apparent, for this combination of properties makes possible the selective sealing of portions of an oil well, and gives the surface operators precise control of the time the well is sealed and out of operation. For example, should it be desired to seal a portion of a well a few thousand feet underground, use of this composition makes it possible to have that section of the well sealed within a matter of a few hours. When the necessity for the seal is over, the seal made with the composition described can be disintegrated and removed as easily as it was set in place, whereas use of conventional sealing agents would require time-consuming mechanical operations, or a 24 to 48 hour wait for the bacterial action to disintegrate the organic gel.

Although the composition of this invention possesses particular value in the sealing of oil wells and earth formations which are to be acid treated because of the acid insolubility of the cement, its usefulness is not restricted to such situations. It can be used in any earth sealing application and its use is of decided advantage when the seal is intended to be merely temporary.

Since certain changes in the composition described involving variation of proportions and specific nature of ingredients, and thereby, different embodiments of the invention could be made without departing from its scope, it is intended that all matter contained in the above description shall be interpreted as illustrative and not in a limiting sense.

What is claimed is:

1. A composition suitable for sealing earth formations comprising, hemihydrate calcium sulfate, about 15–45 per cent by weight of an amide having an $NH_2$ radical substituted for the hydroxyl substituent of an acid derived nucleus, and a non-alkaline water soluble set retarding agent for said sulfate, the composition being characterized by its ability to set through hydration with water to a hard solid containing the amide interspersed in the solid, the said solid being resistant to acid attack but subject to disintegration by alkalies through reaction with the amide.

2. A composition suitable for sealing earth formations comprising, about 40 to 75 per cent of hemihydrate calcium sulfate, about 15 to 45 per cent of an amide having an $NH_2$ radical substituted for the hydroxyl substituent of an acid derived nucleus, and about 5 to 30 per cent of a non-alkaline water soluble set retarder, said composition being characterized by its ability to set to a hard solid through hydration with water, the amide being interspersed through the solid, the said solid being resistant to acid attack but subject to disintegration by alkalies through reaction with the amide.

3. A composition suitable for sealing earth formations comprising, about 40 to 75 per cent of hemihydrate calcium sulfate, about 15 to 45 per cent amide having an $NH_2$ radical substituted for the hydroxyl substituent of an acid derived nucleus, and about 5 to 30 per cent of a non-alkaline, water soluble set retarding agent, said composition being characterized by its ability, when treated with about 50 per cent of its weight of water, to set rapidly to a hard solid having the amide interspersed therein, the solid being resistant to acid attack but subject to disintegration by alkalies through reaction with the amide.

4. A composition in accordance with claim 3 in which the amide is sulfamic acid.

5. A composition in accordance with claim 3 in which the amide is phosphamic acid.

6. The method of temporarily sealing an earth formation comprising, injecting into the formation an aqueous cementitious slurry comprising a calcined gypsum cement in an amount sufficient to form a hard solid resistant to acid attack, and about 15–45 per cent by weight of an amide having an NH₂ radical substituted for the hydroxyl substituent of an acid derived nucleus, permitting said aqueous cementitious slurry to set, thereby to form the seal, and subsequently disintegrating the seal by contacting it with aqueous alkali solution to react with the said amide.

7. The method of temporarily sealing an oil well formation to permit acidizing of an adjacent formation comprising, injecting into the formation to be sealed an aqueous cementitious slurry comprising a calcined gypsum cement and an amide having an NH₂ radical substituted for the hydroxyl substituent of an acid derived nucleus in an amount of about 15 to 45 per cent by weight, said cement being resistant to attack by 15 per cent hydrochloric acid, hydrating the cement to cause it to set and form a seal resistant to acid attack, and subsequently disintegrating the seal after acidizing the well by contacting the seal with aqueous alkali solution to react with the amide.

8. A composition suitable for sealing earth formations comprising, hemihydrate calcium sulfate in an amount sufficient to form a hard solid, 15–45 per cent by weight of an amide having an NH₂ radical substituted for the hydroxyl substituent of an acid derived nucleus and a neutral, water soluble set retarding agent for said sulfate, the composition being characterized by its ability to set through hydration with water to a hard solid containing the amide interspersed in the solid, the said solid being resistant to acid attack but subject to disintegration by alkalies through reaction with the amide.

9. A composition suitable for sealing earth formations comprising, hemihydrate calcium sulfate in an amount sufficient to form a hard solid, 15–45 per cent by weight of an amide selected from the group consisting of sulfamide and phosphamide, and a neutral, water soluble set retarding agent for said sulfate, the composition being characterized by its ability to set through hydration with water to a hard solid containing the amide interspersed in the solid, the said solid being resistant to acid attack but subject to disintegration by alkalies through reaction with the amide.

10. A composition suitable for sealing earth formations comprising, hemihydrate calcium sulfate in an amount sufficient to form a hard solid, 15–45 per cent by weight of an amide selected from the group consisting of sulfamide and phosphamide, and a neutral, water soluble set retarding agent for said sulfate, the composition being characterized by its ability to set through hydration with water to a hard solid containing the amide interspersed in the solid, the said solid being resistant to acid attack but subject to disintegration by alkalies through reaction with the amide.

11. The method of temporarily sealing an oil well formation to permit the treating of adjacent formations which comprises injecting into the formation to be sealed an aqueous cementitious slurry comprising a calcined gypsum cement in an amount sufficient to form a hard solid, an amide selected from the group consisting of sulfamide and phosphamide in an amount between about 15 to 45% by weight, and a neutral, water soluble set retarder, said cement upon hardening being resistant to attack by 15% hydrochloric acid, hydrating the cement to cause it to set and form a seal resistant to acid attack, and subsequently disintegrating the seal after acidizing the well by contacting the seal with aqueous alkali solution to react with the amide.

12. The method of rendering a set foraminous gypsum cement formation subject to disintegration by alkalies comprising, incorporating about 15–45 per cent by weight of a water soluble amide having an NH₂ radical substituted for the hydroxyl substituent of an acid derived nucleus into an aqueous cementitious slurry, containing said gypsum cement in an amount sufficient to form a hard solid, prior to its setting, said amide being present in an amount sufficient to disintegrate the cement formation upon reaction thereof with alkalies.

DONALD C. BOND.
GEORGE G. BERNARD.

REFERENCES CITED

The following references are of record in the file of this patent:

UNITED STATES PATENTS

| Number | Name | Date |
|---|---|---|
| 2,045,899 | Davis | June 30, 1936 |
| 2,127,662 | Grebe | Aug. 23, 1938 |
| 2,152,670 | Shutt | Apr. 4, 1939 |
| 2,161,085 | Phalen | June 6, 1939 |
| 2,187,895 | Sanders | Jan. 23, 1940 |
| 2,191,555 | Berliner | Feb. 27, 1940 |
| 2,216,207 | Menaul | Oct. 1, 1940 |
| 2,341,426 | Dailey | Feb. 8, 1944 |

FOREIGN PATENTS

| Number | Country | Date |
|---|---|---|
| 453,703 | Great Britain | of 1936 |